INVENTORS
ROSS E. GRAVES
JACOB M. SACKS
BY
AGENT

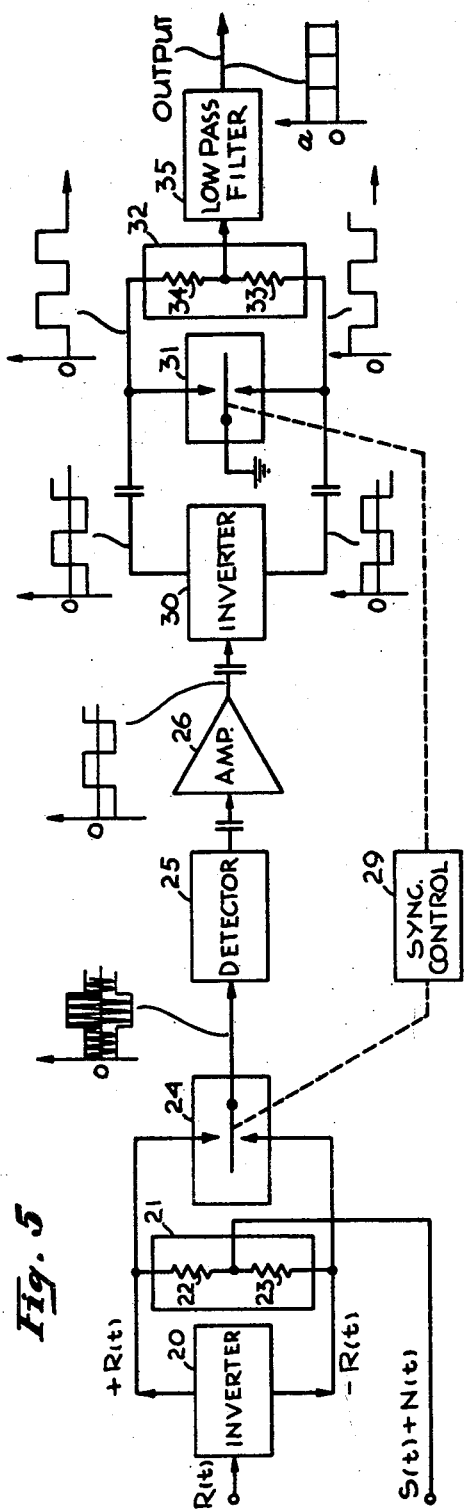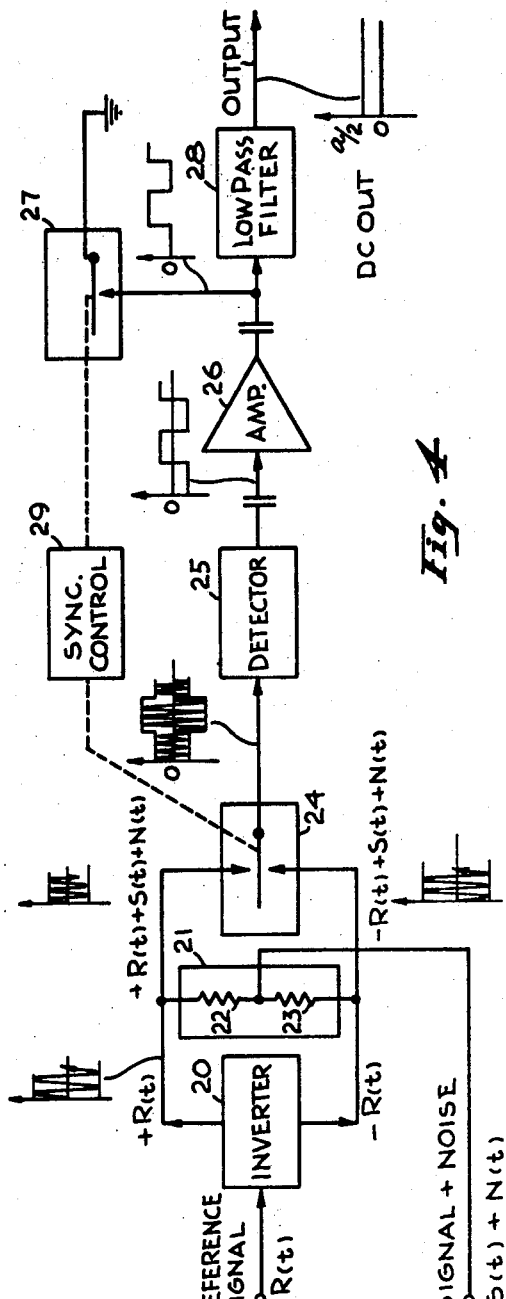
Fig. 4
Fig. 5
INVENTORS
ROSS E. GRAVES
JACOB M. SACKS
BY
AGENT

United States Patent Office 3,142,804
Patented July 28, 1964

3,142,804
PRECISION PHASE DETECTOR
Ross E. Graves, Pacific Palisades, and Jacob M. Sacks, Palos Verdes Estates, Calif., assignors to Space Technology Laboratories, Inc., Redondo Beach, Calif., a corporation of Delaware
Filed Sept. 25, 1962, Ser. No. 226,118
14 Claims. (Cl. 328—133)

This invention relates to phase detectors and, more particularly, to precision phase detectors using commutation and decommutation techniques for eliminating phase errors.

In the prior art the very act of detecting a phase difference between two signals results in a phase error, generated by the device being used to measure the phase difference. In this specification a phase detector is defined as a device or instrument that compares two signals and derives therefrom an output signal whose average value is a measure of the phase relationship between the two signals. Normally, a discussion of phase difference between two signals implies that both signals are of the same frequency but differ in phase and/or amplitude. In conventional phase detectors, a phase difference between two signals being compared from a purely quadratic phase relationship results in a D.C. signal at the output of the phase detector. The polarity of the D.C. signal indicates the direction or sense of the phase offset from quadrature, and the absolute value of the output signal is a measure of the magnitude of the phase difference. Conventional phase detectors depend for their operation on the use of certain types of non-linear circuit elements, such as vacuum tubes, semiconductor diodes, transistors, rectangular loop magnetic core devices and the like. Since these elements are used in pairs or multiples of pairs, the degree to which the elements can be matched or paired against one another influences the ultimate resolution with which the relative phases of the two signals can be determined. Not only is it extremely difficult and costly to match non-linear elements on the basis of static characteristics, but it is essentially impossible to match transfer characteristics on the basis of dynamic variations which may be induced by such mutually independent factors as temperature changes, aging, radiation field effects, and noise rectification errors unpredictably introduced into the measurement as a result of important changes of signal-to-noise ratio in either or both of the input signals.

One of the common balance problems associated with conventional phase detectors manifests itself as a changing D.C. output level (unbalance) with a changing input signal-to-noise ratio, even though the amplitude of the signal component may be invariant. In the case where the amplitude of the signal component of the input (signal plus noise input) changes, the output D.C. level for a quadrature phase relationship may or may not change. If it does not change, the effect may be compensated (in principle) by a knowledge of the amplitude of the signal component of the input, using the same technique as is required to interpret the output signal in terms of phase difference. In any event, should this D.C. level vary with changing signal strength, the functional form of the variation would have to be known before the correction could be made. Since this offset may be dependent not only on the signal component of the input but also on the total noise power which accompanies it and since the offset may not be stable over long periods, the problems of achieving an excellent balance (free from both static and dynamic offsets) are apparent. Moreover, even if the unbalance characteristics were known and predictable, the necessity for incorporating peripheral circuitry to compensate for the unbalance would lead to an excessive degree of complexity associated with the function of the phase detector. In this invention the aforementioned problems are eliminated, and near perfect balance is obtained by effecting commutation on the input signal to the phase detector and decommutation on the output signal of the phase detector.

Further objects and advantages of this invention will be made more apparent by referring now to the accompanying drawings where there is shown:

FIG. 4 illustrates a second embodiment of the invention utilizing a half wave detector;

FIG. 5 illustrates a second embodiment utilizing a full wave detector, and

In the following discussion, reference to a signal, for example, a reference signal as $R(t)$, refers to the generic notation of the signal. Referring to the same signal as $R(\omega t)$ emphasizes the phase of the periodic signal having an angular frequency of $\omega$.

Figure 1:
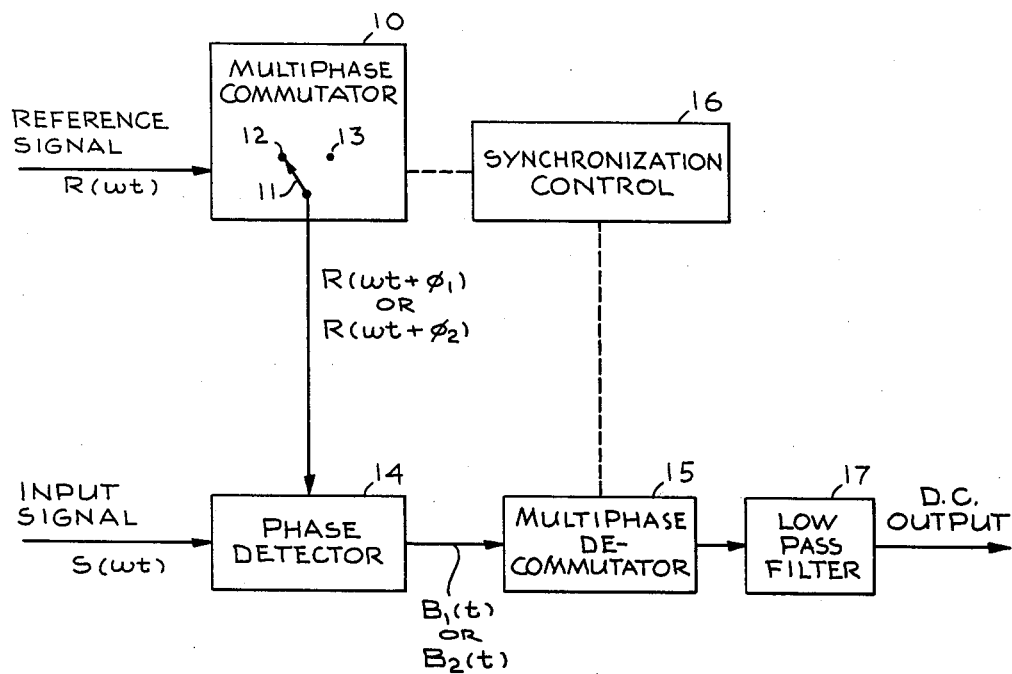
FIG. 1 illustrates a first embodiment of the invention using commutation and decommutation with a conventional phase detector.

Referring now to FIG. 1, there is shown a block diagram illustrating a first embodiment of this invention. This figure illustrates how the benefits of the present invention may be obtained when used in conjunction with a state-of-the-art phase detector. A reference signal $R(t)$ is fed to a multiphase commutator 10. The reference signal is usually sinusoidal in nature; however, for the purpose of the invention, the signal may be rectangular, triangular, or other similar shape. The reference signal is preferably periodic in nature but may include a noise component as will be explained further. The multiphase commutator 10 contains a plurality of phase shifting elements, generally two, each of which is selective in some arbitrarily preferred sequence for connection to an output terminal. The output of the multiphase commutator 10 will therefore consist of a first and second reference signal, each suitably shifted in phase by an amount determined by the selected phase shifting elements comprising the multiphase commutator. The drawing illustrates a switch 11 capable of being moved from a first position 12 to a second position 13. The phase shifting elements associated with position 12 have the capability of shifting the phase of the reference signal a given amount, for example $\phi_1$. Similarly, the phase shifting elements associated with position 13 have the capability of shifting the phase of the incoming reference signal a different amount, for example $\phi_2$. The terminology used to describe the periodic function of the reference signal may be expressed as: $R(\omega t+\phi_1)$ and $R(\omega t+\phi_2)$ where: $\omega=2\pi f$ and $\omega t$ represents the phase of a signal having angular frequency of $\omega$. The output from the multiphase commutator 10 will therefore consist of a commutated reference signal varying from a first phase of $(\omega t+\phi_1)$ to a second phase $(\omega t+\phi_2)$ at the commutation rate which is determined by the length of time the switch 11 is left in position 12 or position 13. The output of the multiphase commutator 10 is fed to a conventional phase detector 14 which generates an output signal by comparing the phase of an unknown input signal with the commutated reference signal received from the multiphase commutator 10. The output of the phase detector 14 will therefore consist of a periodically varying D.C. signal varying at the commutation rate. The output of the phase detector 14 is fed to a multiphase decommutator 15 which acts as a D.C.

restorer for establishing a suitable reference. The multiphase decommutator 15 may be implemented, for example, as a synchronous clamp which clamps one of the output signals from the phase detector 14 to a suitable reference, thus restoring the D.C. component. A synchronization control 16, synchronously, and in proper phase relationship controls the multiphase commutator 10 and the multiphase decommutator 15, thereby controlling the rate of commutation and the time for commutating each signal. The output from the multiphase decommutator 15 is fed to a low pass filter 17 where the output signal is suitably smoothed, that is integrated over a period of time, thereby producing a D.C. output signal that is an accurate measure of the phase relationship between the input signal and the reference signal.

Figure 2:
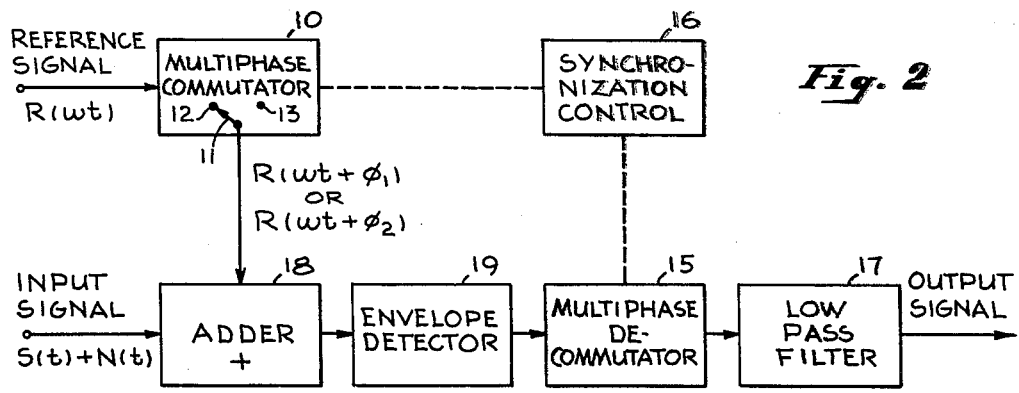
FIG. 2 illustrates a second embodiment which eliminates the conventional phase detector.

Referring now to FIG. 2, there is shown a block diagram of the second embodiment of the invention. Similar reference numbers will be used throughout the description whenever the functions of the devices are identical. The reference signal $R(t)$ is fed to a multiphase commutator 10, as described in connection with FIG. 1. The output signals from the multiphase commutator 10 are identified as $R(\omega t + \phi_1)$ or $R(\omega t + \phi_2)$, and are fed to an adder 18. The adder 18 combines the selective signals received from the multiphase commutator 10 with an input signal which represents the unknown signal that is to be compared with the reference signal. In the general case, the input signal $S(t)$ together with a noise component $N(t)$ is considered. The output of adder 18 is fed to an envelope detector 19. The phase information which is contained in the envelope of the processed signal is detected by the detector 19. The output of the detector 19 is fed to a multiphase decommutator 15. A synchronization control 16 synchronously controls the multiphase commutator 10 and the multiphase decommutator 15. The output from the multiphase decommutator 15 is fed to a low pass filter 17 as before.

The advantage of the commutated phase detector over conventional phase detectors is believed due to the elimination of multiple internal signal paths through separate nonlinear circuit elements with their inherent unbalances. It will also be appreciated by those skilled in the art that phase commutation could also be accomplished in the input signal channel as well as in the reference channel described. There are, however, advantages to be derived from commutating the reference signal since it is usually possible to generate a reference signal that is noise-free and of substantially constant amplitude. The input signal is usually accompanied by considerable noise and of uneven amplitude. It is generally conceded that operation of electronic or mechanical commutating devices is cleaner and more reliable with quiet, constant signals than with noisy ones.

Figures 3A, 3B, 3C:
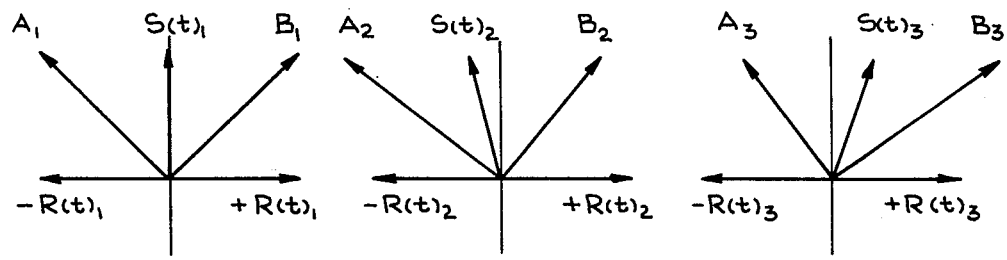
FIG. 3 is a series of phase diagrams illustrating how a phase difference between two signals is detected as an amplitude variation.
Figure 3:
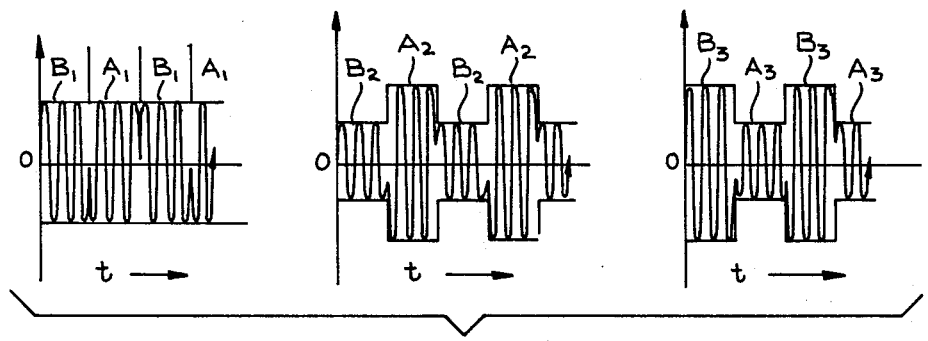

Referring now to FIG. 3, there is shown a series of three phase diagrams and corresponding wave diagrams illustrating how the detector 19 in FIG. 2 can detect the incoming commutated signal in order to produce a varying signal which is indicative of the phase variation between the input signal and the reference signal. The example illustrated in FIG. 3 assumes a reference signal that is commutated or inverted 180 degrees, thereby producing a first reference signal identified as $+R(t)$ and a second inverted signal identified as $-R(t)$. The input signal identified as $S(t)$ plus a noise component $N(t)$ is added pictorially to the reference signls $+R(t)$ and $-R(t)$. FIG. 3(a) illustrates the relationship of the input signal in phase quadrature with respect to the reference signals, thereby resulting in a vector sum of $S(t)$ and $R(t)$ of $B_1$ and a vector sum of $S(t)$ and $-R(t)$ of $A_1$. A visual inspection will show that the magnitudes of vectors $A_1$ and $B_1$ are equal; and as a result, the output of the detector 13 of the incoming commutated signals $A_1$ and $B_1$, having the phase relationship illustrated in FIG. 3(a), will produce a detected output of constant amplitude. It will be remembered that the time for the A and B signals will be determined by the commutation rate which is controlled by the synchronization control 16 illustrated in FIG. 1 and FIG. 2.

Referring now to FIG. 3(b), there is illustrated a situation in which the input signal is at an angle greater than phase quadrature with respect to the reference signal. An analysis of the phase diagram will show that vector $A_2$ will have a greater amplitude than vector $B_2$, thereby resulting in an output signal from detector 19 that varies in amplitudes from the magnitude of vector B to the magnitude of vector A at the commutation rate. The varying output signal being periodic in nature is then capable of being amplified in a suitable A.C. amplifier.

Referring now to FIG. 3(c), there is illustrated a situation in which the input signal is at a phase angle with respect to the reference signal that is less than quadrature. In this configuration, the vector $B_3$ has an absolute magnitude that is greater than vector $A_3$, thereby resulting in an output signal that varies from the magnitude of $B_3$ to the magnitude of $A_3$ at the commutation rate. A comparison of the output signals of FIGS. 3(b) and 3(c) will show that the sense information is inherent in the varying signal and is obtainable by suitable synchronous decommutation techniques.

Referring now to FIG. 4, there is shown a first embodiment of the invention using a half wave rectifier in the output circuit. The reference signal is applied to the input terminals of a paraphase inverter or phase splitter 20. At one output terminal of the inverter 20 is a signal $R(t)$ which is a replica of the reference signal, whereas at the second output of the inverter 20 is a signal $-R(t)$ having the same amplitude as that in the first terminal but out of phase by 180 degrees. Connected across the output of the inverter 20 is a linear adding circuit 21, composed of identical impedances 22 and 23. The input signal $S(t)$ with noise component $N(t)$ is fed to the junction of impedances 22 and 23, thereby effectively being combined with the reference signals $+R(t)$ and $-R(t)$. A commutator or chopper 24 is illustrated in the form of a single-pole, double-throw switch which may be either mechanical or electronic in form. The output of the commutator 24 periodically and alternately selects one of the signals $S(t)+N(t)+R(t)$ and $S(t)+N(t)-R(t)$, and applies this signal to a detector 25. The detector 25 may be a simple diode detector for detecing the envelope variations of the incoming signal as more fully set forth in connection with FIG. 3. It can be shown mathematically that the relative phase information is transmitted in the form of the differential magnitude of the varying D.C. component of the detector output. The detected or rectified envelope is amplified to a useable level in an A.C. coupled amplifier 26 which also eliminates D.C. amplifier drift problems. The output of the A.C. amplifier 26 is decommutated by switch 27 which restores the phase carrying differential D.C. component of the signal by synchronously rectifying or clamping the signal to a suitable potential, in this case ground. The rectified D.C. signal is fed through a low pass filter integrating circuit 28 which produces a D.C. output signal whose amplitude and polarity are an accurate measure of the magnitude and sign of the phase difference between the input signal $S(t)$ and the reference signal $R(t)$. Unless the system is purposely designed otherwise, the D.C. output voltage will be zero if the reference signal and the input signal are in phase quadrature. A synchronization control 29 is connected to the commutator 24 and the decommutator 27 to assure that commutation and decommutation are in synchronism with each other. The control linkage is illustrated as being mechanical in nature, however, the actual control may be either electrical or electronic, depending on the nature of the commutator and decommutator used.

Referring now to FIG. 5, there is shown a similar arrangement illustrated in FIG. 4 in which the output signal is subject to full wave rectification. Similar items in FIG. 5 carry similar numbers as illustrated in FIG. 4. The input signal and the reference signal are similarly applied as indicated in FIG. 4. The difference is apparent by considering the A.C. amplifier 26 which in the present case is fed to a paraphase inverter 30, which produces a first signal that is substantially the same as the input signal and a second signal that is equal in amplitude but substantially 180 degrees out of phase. Each of the output signals from the paraphase inverter 30 is subject to the action of a decommutator 31, which alternately and repeatedly clamps each of the signals to ground synchronously with commutator 24 as controlled by the synchronization control 29. The commutated output signals are combined in an adder 32, which is composed of a pair of identical impedances 33 and 34. The combined output signal is fed to a low pass integrating filter 35. The output signal of the low pass filter 35 will be at the average value of both of the decommutated signals as opposed to the output signal of FIG. 4, which had an average value of only one-half of the decommutated signal. The full wave rectifier system just described also eliminates a large A.C. component at the sampling frequency which is present at the input to the low pass integrator.

Figure 6:
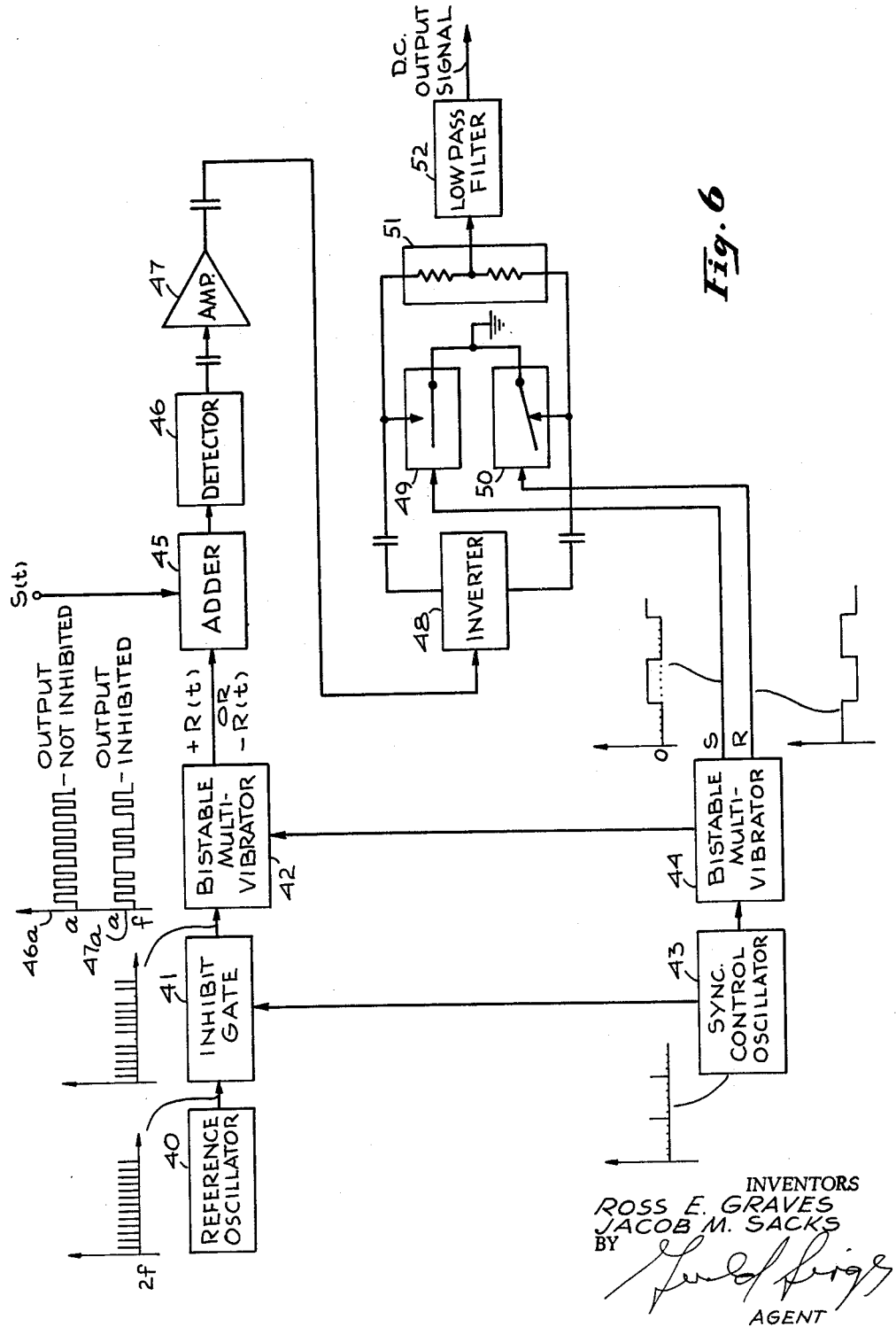
FIG. 6 illustrates a third embodiment of the invention using a full wave detector.

Referring now to FIG. 6, there is shown an all electronic full wave system using a digital phase inverter which has certain advantages over vacuum tube, transistor, parametric subharmonic oscillators, or transformer paraphase inverters. In this system it is also unnecessary to use a separate commutator since the commutation function occurs within a digital phase inverter. The reference signal is generated in a reference oscillator 40 which is operated at twice the desired reference frequency. The reference oscillator 40 generates a signal that is passed through inhibit gate 41 to bistable multivibrator 42, which serves as a scale of two frequency divider and, hence, the reason for generating twice the desired frequency in the reference oscillator. The synchronization control oscillator 43 is operated at substantially lower frequency than the frequency of the bistable multivibrator 42, since its purpose will be the same as previously described; and that is to control the rate of commutation and decommutation. The synchronization control oscillator 43 generates a sequence of inhibit pulses which are fed into the inhibit gate 41 and also to a bistable multivibrator 44 every time the inhibit gate 41 receives an inhibit pulse from the synchronization control oscillator 43. The inhibit gate inhibits an odd number, preferably one, of the pulses from the reference oscillator 40 from reaching the bistable multivibrator 42. The output of the bistable multivibrator 42 is fed to an adder circuit 45 which combines the reference signal with the input signal S(t). The output of the multivibrator 42 in which an inhibit pulse is not transmitted will be a series of pulses at the reference frequency as indicated in diagram 46a. This is to be compared with diagram 47a, which illustrates the output of the multivibrator 42, when inhibiting pulses are received periodically by inhibiting gate 41. It will be observed that every inhibited pulse results in a phase reversal in the output of the bistable multivibrator 42, thereby effectively and repeatedly generating a first reference signal identified as +R(t) and a second reference signal 180 degrees out of phase, identified as −R(t). The sequence of repeated phase reversed signals feeding the adder 45 will, therefore, be a function of the frequency of the synchronization control oscillator 43. The output of the bistable multivibrator 44 at the set and reset terminals will be a series of pulses, 180 degrees out of phase with each other and at a frequency that is one-half the frequency of the synchronization control oscillator 43. In order to eliminate the possibility of 180 degrees phase ambiguity in the phase equilibrium relationship between S(t) and R(t), a reset line is shown between the bistable multivibrator 44 and the bistable multivibrator 42. In the event that noise or other disturbances cause either bistable multivibrators to lose one or more counts which would result in an improper phase relationship (180 degrees), the delayed reset pulse from the bistable multivibrator 44 will insure that proper phase conditions are reestablished in a time less than the period of the synchronization control, thus minimizing the duration of any phase error transient disturbances and eliminating the possibility of 180 degrees steady state phase error. During the inhibit period, the bistable multivibrator is quiescent. Observation of either output terminal of the bistable multivibrator 42 discloses an apparent phase shift of 180 degrees of the signal with respect to what it would have been had the inhibit pulse not occurred. The adder 45 is a simple linear adder, as previously described, which combines the received signals with the input signal S(t). Since the input reference signals to the adder 45 are received sequentially, the need for a separate commutator is eliminated due to the inherent action of the bistable multivibrator 42. As described previously, the output of the adder 45 is fed to a detector 46 and then to an A.C. amplifier 47, where the A.C. signal is suitably amplified. The gain of the A.C. amplifier reduces the balance requirement on the D.C. stages which follows the decommutator 20 by a factor equal to the A.C. voltage gain. An A.C. paraphase inverter 48 is coupled to the output of the amplifier 47 and provides two mutually inverted envelope signals of equal amplitude. These signals are A.C. coupled to a pair of identical synchronous switches 49 and 50 which operate alternately as a pair of synchronous clamps under the control of the bistable multivibrator 44. The varying D.C. components of the two rectified signals carry the desired phase information and are combined in a linear adder 51, the output of which is fed to a low pass integrator 52. A simple analysis will show that while the D.C. component combines additively in the adder 51, the fundamental and harmonics of the sampling or commutation wave form identically cancel out in the full wave embodiments. The use of a low pass integrator provides a smoother output.

This completes the description of the particular embodiments of the invention illustrated herein. However, many modifications thereof will be apparent to persons skilled in the art without departing from the spirit and scope of this invention. Accordingly, it is desired that this invention not be limited by the particular details described herein, except as defined by the appended claims.

What is claimed is:

1. In combination,
    means for applying a first signal to a multiphase commutator, said multiphase commutator generating a commutated first signal by selectively changing the phase of said first signal from a first value to a second value, thereby selectively producing at least two first signals of different phase,
    means for combining each of said first signals with a second signal,
    a detector responsive to said combined signal for generating an output signal that varies in amplitude as the phase difference between said second signal and said commutated first signal varies,
    a multiphase decommutator synchronous with said multiphase commutator and responsive to said output signal from said detector for restoring the D.C. level of said output signal, and
    means for smoothing said output signal.

2. In combination,
    means for applying a first signal to a multiphase commutator, said multiphase commutator generating a commutated first signal by selectively changing the phase of said first signal from a first value to a second value, thereby selectively producing at least two signals of different phase,
    means for combining each of said first signals with a second signal,
    a detector responsive to said combined signal for generating an output signal that varies in amplitude as the phase difference between said second signal and said commutated first signal varies, a multiphase decommutator responsive to said output signal from said detector for restoring the D.C. level of said output signal, said multiphase commutator and said multiphase decommutator being synchronized for simultaneous operation, and a low pass integrating filter connected to said multiphase decommutator for integrating said D.C. output signal and thereby producing a smoothed D.C. signal that is an accurate measure of the phase relationship between said first signal and said second signal.

3. In combination, means for applying a reference signal to a commutator, said commutator selectively changing the phase of said reference signal 180 degrees, thereby generating two reference signals 180 degrees apart, means for combining each of said reference signals with an input signal, a phase detector responsive to said combined signal for generating an output signal that varies in amplitude as the phase difference between said input signal and said commutated reference signal varies, a synchronous clamping circuit responsive to said output signal from said phase detector for restoring the D.C. level of said output signal, said commutator and said synchronous clamping circuit being controlled for simultaneous operation, and a low pass integrating filter connected to said synchronous clamping circuit for integrating said D.C. signal and thereby producing a smoothed D.C. signal that is an accurate measure of the phase relationship between said reference signal and said input signal.

4. In combination, means for applying a reference signal to a phase inverter, said phase inverter generating a pair of reference signals of substantially equal amplitude and differing in phase by 180 degrees, means for combining an input signal with each of said reference signals, thereby generating a first combined signal and a second combined signal that differ in amplitude as a function of the phase difference between said reference signal and said input signal, means for commutating said first combined signal and said second combined signal at a given rate, thereby generating a commutated signal, means for detecting said commutated signal, means for decommutating said commutated signal at said given rate, thereby generating a decommutated signal, and means for integrating said decommutated signal, thereby generating a D.C. signal that is an accurate measure of the phase relationship between said input signal and said reference signal.

5. In combination, means for applying a reference signal to a phase inverter, said phase inverter generating a pair of reference signals of substantially equal amplitude and differing in phase by 180 degrees, means for combining an input signal with each of said reference signals thereby generating a first combined signal and a second combined signal that differ in amplitude as a function of the phase difference between said reference signal and said input signal, means for commutating said first combined signal and said second combined signal at a given rate, thereby generating a commutated signal, means for detecting the amplitude differences between said first combined signal and said second combined signal comprising said commutated signal, thereby generating an A.C. varying signal, means for amplifying said A.C. signal, a synchronous clamping circuit responsive to said A.C. signal for restoring the D.C. component of said A.C. signal, and means for filtering said restored signal, thereby producing a smoothed D.C. signal that is an accurate measure of the phase relationship between said reference signal and said input signal.

6. In combination, means for applying a reference signal to a first phase inverter, said first phase inverter generating a pair of reference signals of substantially equal amplitude and differing in phase by 180 degrees, means for combining an input signal with each of said reference signals, thereby generating a first combined signal and a second combined signal that differ in amplitude as a function of the phase difference between said reference signal and said input signal, means for commutating said first combined signal and said second combined signal at a given rate, thereby generating a commutated signal, means for detecting said commutated signal, thereby generating an A.C. varying signal, a second phase inverter for inverting the phase of said A.C. varying signal, thereby producing a pair of A.C. varying signals of substantially equal magnitude and differing in phase by 180 degrees, means for alternately and synchronously with said commutating means clamping each of said A.C. varying signals to the same potential level, and means for combining each of said clamped signals to produce a D.C. signal that is an accurate measure of the phase relationship between said reference signal and said input signal.

7. A combination according to claim 6 which includes a low pass integrating filter connected to said combining means for smoothing said D.C. signal.

8. In combination, means for generating a reference signal, a biphase commutator for selectively changing the phase of said reference signal 180 degrees at a given rate, thereby producing a pair of reference signals 180 degrees apart, means for combining each of said reference signals with an input signal, a detector responsive to said combined signal for generating an output signal that varies in amplitude as the phase difference between said second signal and said commutated first signal varies, a biphase decommutator synchronous with said biphase commutator and responsive to said output signal from said detector for restoring the D.C. level of said output signal, and means for filtering said restored signal, thereby producing a smoothed D.C. signal that is an accurate measure of the phase relationship between said reference signal and said input signal.

9. A combination according to claim 8 in which said commutating frequency is a submultiple of said reference frequency.

10. In combination, means for generating a reference signal, a first biphase commutator for selectively changing the phase of said reference signal 180 degrees at a given rate, thereby producing a pair of reference signals 180 degrees apart, means for combining each of said reference signals with an input signal, a detector responsive to said combined signal for generating an output signal that varies in amplitude as the phase difference between said second signal and said commutated first signal varies, means for detecting said commutated signal, thereby generating an A.C. varying signal, a second phase inverter for inverting the phase of said A.C. varying signal, thereby producing a pair of A.C. varying signals of substantially equal magnitude and differing in phase by 180 degrees, means for alternately and synchronously with said commutating means clamping each of said A.C. varying signals to the same potential level, and means for combining each of said clamped signals to produce a D.C. signal that is an accurate means of the phase relationship between said reference signal and said input signal.

11. In combination, a multiphase commutator responsive to a first signal for commutating said first signal, a phase detector responsive to said commutated first signal and an input signal for generating an output signal in response to the phase difference between said input signal and said commutated first signal, a multiphase decommutator synchronous with said multiphase commutator and responsive to said output signal from said phase detector for restoring the D.C. level of said output signal, and means for smoothing said output signal.

12. In combination, a multiphase commutator responsive to a reference signal for commutating said reference signal, a phase detector responsive to said commutated first signal and an input signal for generating an output signal in response to the phase difference between said input signal and said commutated reference signal, a clamping circuit synchronous with said multiphase commutator and responsive to said output signal from said phase detector for restoring the D.C. level of said output signal, and means for smoothing said output signal.

13. In combination, a multiphase commutator responsive to a reference signal for commutating said reference signal between a first phase and a second phase, a phase detector selectively responsive to said commutated reference signal and an external input signal for generating an output signal in response to the phase difference between said input signal and said commutated first signal, a multiphase decommutator synchronous with said multiphase commutator responsive to said output signal from said phase detector for restoring the D.C. level of said output signal, and low pass filtering means connected to said multiphase decommutator for integrating said D.C. output signal and thereby producing a smooth D.C. output signal having amplitude and sense information that vary as phase between said reference signal and said input signal varies.

14. A combination according to claim 13 in which said commutation frequency is a submultiple of said reference signal frequency.

No references cited.